UNITED STATES PATENT OFFICE.

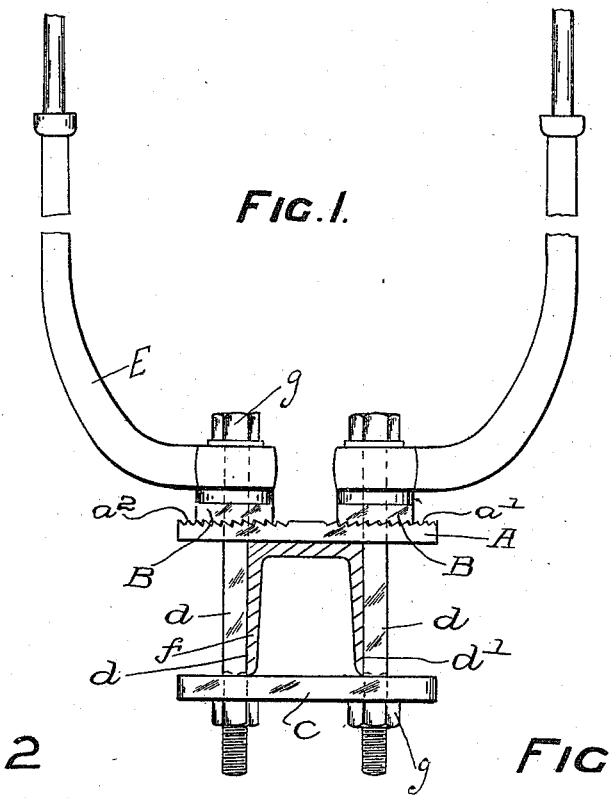

GEORGE TOM HILTON AND FRANK BARCLAY COPPELL, OF RUGBY, ENGLAND, ASSIGNORS TO ROTAX MOTOR AND CYCLE COMPANY, OF LONDON, ENGLAND.

ADJUSTABLE LAMP-BRACKET FOR MOTOR-CARS AND OTHER VEHICLES.

984,813.  Specification of Letters Patent.  Patented Feb. 21, 1911.

Application filed November 11, 1909. Serial No. 527,435.

*To all whom it may concern:*

Be it known that we, GEORGE TOM HILTON and FRANK BARCLAY COPPELL, subjects of the Kingdom of Great Britain, residing at 4, 5, and 6 North street, Rugby, in the county of Warwick, England, motor and cycle engineers, have invented a new and useful Adjustable Lamp-Bracket for Motor-Cars and other Vehicles, of which the following is a specification.

This invention relates to the class of adjustable lamp bracket for use in connection with motor cars and other vehicles, which is capable of attachment to the frame, dumb iron or other suitable part of the vehicle, without necessitating holes being made therein. Hitherto previous devices have not been successful by reason of their liability to shake loose when subjected to vibration, such as caused during the travel of the vehicle.

This invention has for its object a bracket in which the gripping action is of such a nature as to render the attachment firm and rigid under all conditions, while greater latitude is obtained in the sizes of articles to which a single apparatus may be applied.

According to this invention motion is communicated to gripping members in three or more different directions and tension members are adapted in the operation of fixing the bracket to be displaced in such a manner as to close onto or grip the article to which the device is applied. By this process of gripping on several faces concurrently in contradistinction to the class wherein the corners only are gripped, a much more reliable and satisfactory attachment is obtained.

In order that this invention may be clearly understood and more easily carried into practice, reference may be had to the appended explanatory sheet of drawings, on which—

Figure 1 is an elevation showing our improved bracket with the parts assembled as applied to a bracket for carrying a lamp. Fig. 2 is a diagrammatic view showing the inclined planes in the position they occupy before the bracket is screwed up. Fig. 3 is a diagrammatic view showing the inclined planes when the bracket is securely fixed in position. Fig. 4 shows one of the hereinafter described washers having inclined planes. Fig. 5 is a view of the top plate. Fig. 6 illustrates the lower plate. Fig. 7 shows one of the connecting bolts or spindles by which the bracket is retained in position.

In an embodiment of this invention such as illustrated by the drawings, a plate A is provided on which is formed a transverse inclined plane $a'$ or planes, which depends toward the center of the plate. A plurality of planes or teeth is employed to render the bracket adjustable to various size frames and the like, and it is preferable to have a duplicate set of planes $a^2$. Washers $b$ having planes $b'$ similar to those on the plate A are adapted to engage with the planes $a'$, $a^2$, while a lower plate C slotted at $c'$ forms the second face of the bracket. The elements or spindles $d$ which connect the top and lower plates, A, C, are provided on the side adjacent to the frame $f$ with a flat face $d'$ and for this purpose may be of square or other suitable section, the upper portions of such spindles $d$ being extended at $d^2$ and provided with a collar $d^3$ to accommodate the lamp bracket arms E or other article to be supported. I prefer to elongate the holes in the top and bottom plates A, C as shown in Figs. 5 and 6 in order to allow of lateral adjustment of the connecting elements $d$, while the arms E may be rotated around their pivots $d^2$ to the requisite position.

In operation, the plates A, C are placed above and below the frame, the spindles $d$ threaded through and then together with washers B are adjusted in close relation to the sides of the frame $f$ so that the engaging inclined planes $a'$, $b'$ occupy relative positions such as shown in Fig. 2. Upon the nuts $g$ being screwed up the plate A and washer B will be pressed closely together thereby compelling the latter to move down the inclined planes $a'$ $a^2$ to a position such as clearly shown by Fig. 3. It will be readily understood that by the last mentioned movement the spindles $d$ are caused to approach each other whereby the frame $f$ is concurrently gripped by the four faces of the bracket. It will thus be seen that by the improved mode of attachment whereby the sides are adapted to grip additionally to the top and bottom a particularly secure and rigid fitting is obtained.

Having now described our invention we declare that what we claim is:—

The hereinbefore described device comprising a top plate provided with elongated slots and having serrations formed on its top face transversely of its length, slotted washers having transversely disposed serrations to engage with those of the top plate, a bottom plate provided with elongated slots alined with those of the top plate, bolts passing through the slotted washers and top and bottom plates, collars on the bolts above the washers, said bolts projecting above the collars, and having their ends screw threaded, lamp bracket arms mounted on the bolts above the collars, and nuts clamping the parts together.

In witness whereof we have hereunto set our hands in the presence of two witnesses.

GEORGE TOM HILTON.
FRANK BARCLAY COPPELL.

Witnesses:
H. D. JAMESON,
F. L. RAND.